Patented Apr. 3, 1923.

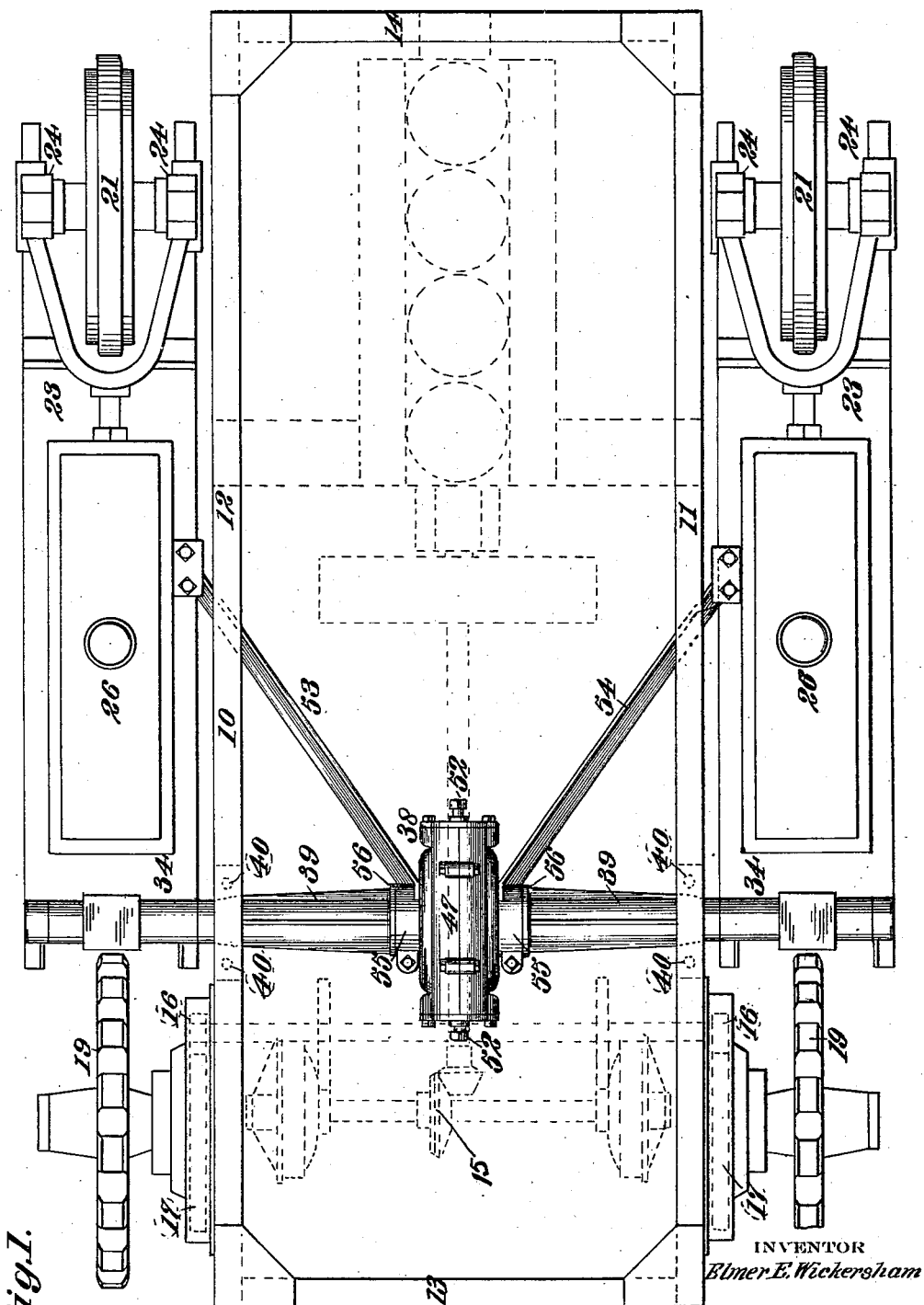

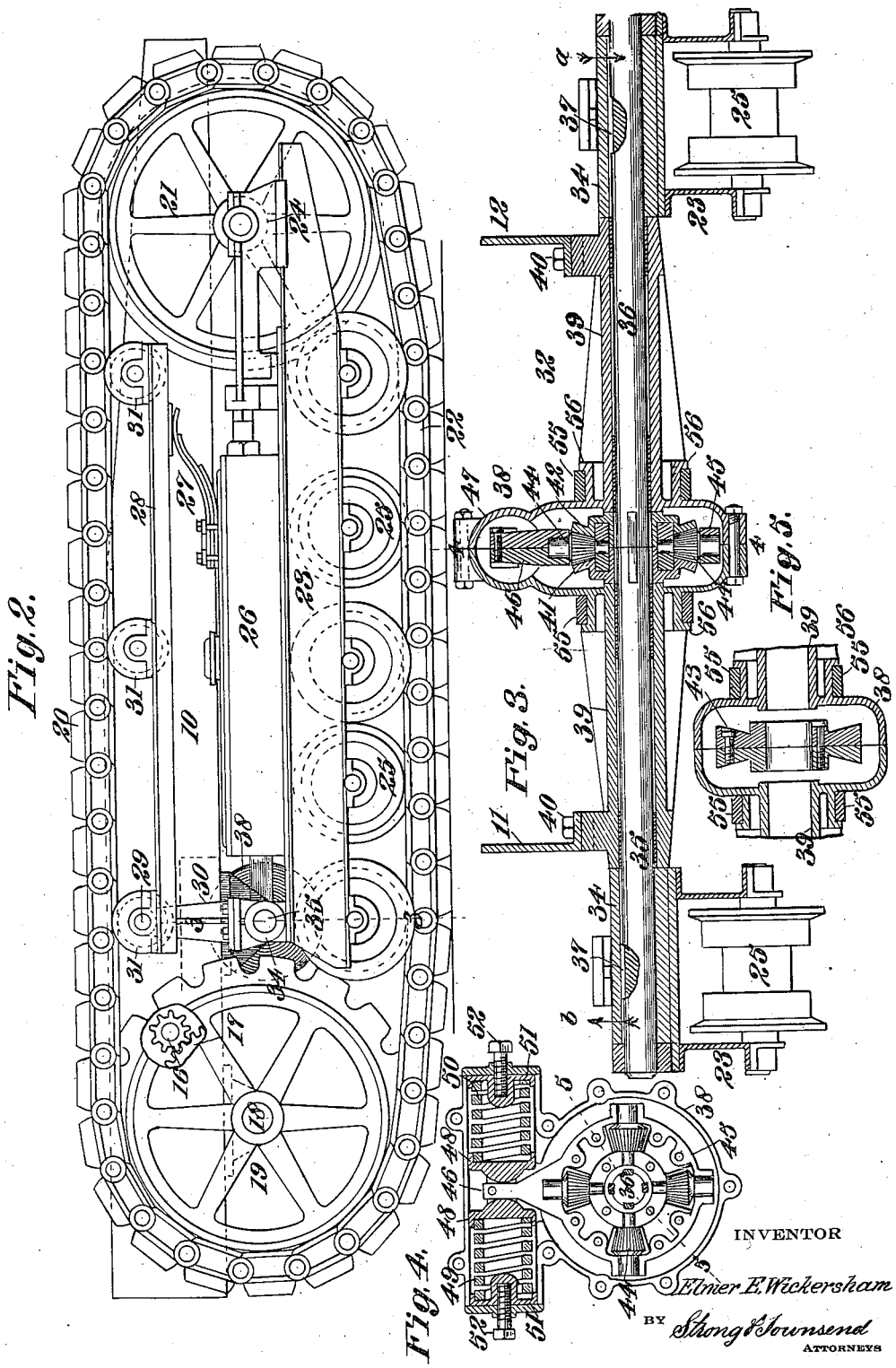

1,450,470

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

SINGLE-POINT FRAME SUSPENSION.

Application filed July 30, 1919. Serial No. 314,205.

*To all whom it may concern:*

Be it known that I, ELMER E. WICKERSHAM, a citizen of the United States, residing at Stockton, in the county of San Joaquin and State of California, have invented new and useful Improvements in Single-Point Frame Suspensions, of which the following is a specification.

This invention relates to a main frame suspension, particularly adapted to be used with the trucks and main frame of chain track tractors.

Engineers interested in the design of chain track tractors have been concerned with the problem of frame suspension and the design of a mechanism which will permit satisfactory yieldable action of the truck at the opposite sides of the frame and at the same time will insure that a minimum movement of the frame will be effected by the vibration and oscillation of the truck units. In solving this problem various spring suspensions have been provided and link and pivotal connections used which have developed into frame suspensions, the most popular of which is the three point suspension which will permit variable movement of the two truck units and a minimum movement of the main frame. These structures have, in most instances, been very complicated and cumbersome and it is the object of the present invention to provide a frame suspension adapted to unite the truck unit and the main frame by a single point of connection and to furnish a very simple, mechanical structure which will insure that relative movement of the two truck units may be produced in vertical plane and that a minimum movement of the main frame will result. The present structure being further provided to transpose the weight of the main frame upon the outer three ends of the truck frame by a system of leverage when there is a tendency for the chain to climb and the forward end of the tractor to rise.

The present invention contemplates the use of the usual tractor main frame and the oppositely disposed chain track truck units, said units being pivotally mounted to the main frame along a common transverse axis and further provided with differential mechanism whereby movement of one unit will tend to move the other unit in an opposite direction with the result that the main frame will be moved a minimum distance in relation to the change in relative positions of the truck frame, said structure being provided with resilient means for accommodating excessive shock and overload.

The invention is illustrated by way of example in the accompanying drawings, in which;

Fig. 1 is a view in plan showing a tractor main frame, the skeletons of opposite truck frames and the frame suspension connecting the various elements.

Fig. 2 is a view in side elevation showing the trucks of the tractor and further disclosing the point of connections between the tractor frame and the main frame.

Fig. 3 is a view in central vertical section through the point of suspension seen on the line 3—3 of Fig. 2.

Fig. 4 is a view in transverse section through the suspension mechanism as seen on the line 4—4 of Fig. 3.

Fig. 5 is a view in section through the differential mechanism of the frame suspension, as seen on the line 5—5 of Fig. 4.

In the drawings, 10 indicates a main frame. This frame may be of any desired design and is here shown as formed with parallel side rails 11 and 12 and cross-rails at the opposite ends thereof, as indicated at 13 and 14. This frame is normally designed to accommodate an internal combustion engine and to be fitted with a draw bar for traction purposes. A suitable power transmission mechanism is mounted upon the rear of the frame, as indicated at 15 and is fitted with driving pinions 16 which are adapted to engage final drive gears 17. These gears are mounted upon axles 18 and are intended to drive the sprockets 19 of chain track units 20, one of which is disposed along each side of the main frame. The sprockets 19 are intended to be in the same plane with idler wheels 21, which are disposed near the forward ends of the main frame and which receive a chain track 22. This track passes successively over the sprocket and the idler wheel to produce the proper locomotion of the vehicle. The idler wheels are mounted upon truck frames 23 by means of bearings 24. These frames support a plurality of load-carrying rollers 25, which rest upon the lower run of chain tracks and upon which the weight of the tractor is imposed. In the drawings, an oil tank 26 is shown as mounted upon the truck frames at the point intermediate their length for supplying lubricating fluid to the load supporting rollers. Mounted upon this tank is a leaf-spring 27 adapted to extend upwardly and forwardly and to receive the forward end of a rail 28. This rail is pivoted near the rear end of the truck frame upon a pin 29 carried by standards 30. The rail is provided to receive a plurality of chain supporting rollers 31, which will support the upper run of the chain track and prevent it from lashing.

The main features of design of the tractor may be those commonly used. The present invention being more particularly concerned with a frame suspension structure 32, which is shown in detail in Fig. 3 of the drawings. By reference to this figure it will be noted that the truck frames 23 are each fitted with tubular bearings 34. These bearings are separately fitted with shafts 35 and 36, that is to say, one bearing is provided with the shaft 35, while the opposite bearing is provided with the shaft 36. The shafts are secured against rotation within their respective bearings by keys 37. The shafts 35 and 36 are in longitudinal alignment and terminate in abutting relation to each other within a case 38. The case 38 is formed with tubular extensions 39, through which the shafts 35 and 36 extend and which portions are rigidly secured to the side rails 11 and 12 by machine bolts 40, which engage bolting pads formed integral with the tubular extensions. The main portion of the case 38 is disposed midway between the side-rails 11 and 12 and is of sufficient dimensions to accommodate a differential gear set.

The gear set comprises a pair of complementary gears 41 and 42, which are secured by means of keys upon the adjacent ends of the shafts 35 and 36, respectively. A bearing ring 43 is disposed around the hubs of the gears 41 and 42 and is adapted to accommodate the shafts of differential pinions 44. These pinions are interposed between the gears 41 and 42 and are in constant mesh with both of them. The outer ends of the pinions are carried by a gear spider 45. This spider is more particularly shown in Fig. 4, where it will be seen to provide suitable bearings for the outer ends of the pinion shaft and at the same time to be formed with a torsion arm 46. In the drawings, this arm is shown as extending vertically into an enlargement 47 of the gear case 38. It will be understood, however, that the arm might extend in any direction and that its length is not limited to the short dimensions shown in the drawings, but might be varied to meet various working conditions. The torsion arm terminates between caps 48. These caps are provided with springs 49 and 50, which may be tensioned by the action of pressure discs 51 and bolts 52. The tensioning of these springs is determined by the maximum normal load of the tractor and is such as to accommodate and absorb shocks and overloads in excess of this maximum load.

In order to rigidly secure the tractor frames in parallel alignment with each other and to at the same time permit them to have independent vertical movement, brace rods 53 and 54 are provided. These rods extend diagonally from points along the inner sides of the truck frames to bearing surfaces around the tubular extensions 39 of the housing, and there terminate in sleeves 55 which are interposed between the sides of the housing 38 and collars 56 formed upon the tubular extensions of the housing.

In operation of the present invention, the running gear is assembled and the suspension unit 32 disposed at a point near the rear end of the truck frame 23. The main frame can then be mounted in the position previously described and secured to the tubular extensions 39 of the housing. Under normal conditions, the vehicle will travel along the roadway with the two chains of its track unit moving at the same rate of speed and with the trucks in parallelism both with the roadway and each other. Assuming that the truck on the right hand side of the tractor meets an obstruction which would cause its forward end to swing upwardly, this action will tend to rotate the shaft 36 in the direction of the arrow —a— as indicated in Fig. 3 and will tend to produce a reverse rotation of the shaft 35 in the direction of the arrow —b—. This action will be brought about due to the rotation of the gear 42 by the shaft 36 and the reverse motion which will be imparted to the gear 41 by the interposed pinions. In view of the fact that the left hand truck is resting upon the solid ground it will be impossible for it to be moved downwardly at its forward end with the result that the action of the shaft 36 will be imparted to the spider 45 of the differential. The torsion arm of this spider will then tend to swing rearwardly and will thus transfer the motion to the housing 38 and the main frame. This action will lift the forward end of the housing and due to the arrangement of the differential gearing, will cause the housing to raise a distance equal to one-half the rise of the right hand truck. In the event that an overload is applied to the trucks, the rear spring 49 will be compressed to absorb this load. It will be readily understood that the same operation will take place, in the event that the opposite truck is raised. When both trucks are permitted to swing upwardly and downwardly simultaneously, they will, of course, have a locking action in relation to each other and will act through the spider and its torsion arm to swing the main frame in the same position, and to maintain the trucks and the main frame in parallelism. Due to this arrangement, a truck action will be produced which will render the entire running gear structure rigid and will prevent distortion of the shafts 35 and 36 under undue strain and adverse conditions presented by the weight of the engine upon the front end of the main frame when considered with the length of the lever arms, produced by the portion of the main frame extending forwardly of the axis of shafts 35 and 36. This arrangement will thus tend to utilize the weight of the tractor to overcome the climbing action of the chain and in theory to apply the lever load of the tractor frame to the forward riding end of the truck frames and thereby tend to hold the truck frames upon the ground in opposition to the action of the chain.

It will thus be seen that by the use of the present frame suspension, a large number of machine parts will be eliminated and at the same time a desirable equalizing movement of the truck units will be permitted and additional traction efforts produced by the peculiar lever arrangement of the frame and trucks in relation to each other and the single point of suspension. It will be further observed that excessive shocks and over-loads will be readily absorbed by the springs 49 and 50, and that, in fact, all of the desirable results of common spring suspension will be produced without the complications of construction.

While I have shown the preferred form of my invention, as now known to me, it will be understood that various changes may be made in the combination, construction and arrangement of parts without departing from the spirit of the invention, as claimed.

Having thus described my invention, what I claim and desire to secure by Letters Patent is:—

1. In a vehicle, a main frame, a track laying truck mechanism at each side thereof, a divided shaft journaled on the main frame, and each part thereof connected with the adjacent truck mechanism, said shaft constituting the only load supporting connection between the main frame and the trucks, and connecting means between the adjacent ends of the divided shaft for stabilizing the main frame and equally distributing the weight thereof on opposite trucks.

2. In a tractor, a main frame, self-laying track mechanisms disposed at opposite sides thereof, suspension means for the main frame arranged on a single transverse line, and means embodied in said frame suspension for equalizing the load on opposite truck mechanisms and stabilizing the main frame.

3. In a tractor having a main frame, and a track-laying mechanism at each side thereof, combined equalizing means and frame suspension comprising a pair of transversely disposed and longitudinally aligned shafts, upon the outer ends of which the truck units are secured, and differential mechanism uniting the contiguous ends of said shafts.

4. In combination with the main frame and the opposite parallel truck units of a chain track tractor, a pair of transversely disposed and longitudinally aligned shafts, upon the outer ends of which the truck units are secured, a differential mechanism uniting the contiguous ends of said shafts and producing an equalization of the movement of one of the truck units in relation to the main frame, and means for absorbing an over-load acting against said equalizing mechanism.

5. In combination with the tractor main frame and oppositely disposed parallel chain track units, of a frame suspension mechanism comprising a pair of longitudinally aligned and transversely disposed shafts, means for rotatably supporting said shaft from the main frame, rigid connections between the outer ends of said shafts and their respective truck units, complementary gears, one of which is secured upon the contiguous end of each shaft, a set of planetary pinions interposed between said gears and in constant mesh therewith, a differential spider circumscribing said pinions and providing a bearing therefor, and means whereby relative vertical movement of one truck unit in relation to the other unit will act through the differential spider to produce a modified movement of the main frame.

6. In combination with the tractor main frame, and oppositely disposed parallel chain track units, of a frame suspension mechanism comprising a pair of longitudinally aligned and transversely disposed shafts, means for rotatably supporting said shafts from the main frame, rigid connections between the outer ends of said shafts and their respective truck units, complementary gears, one of which is secured upon the contiguous end of each shaft, a set of planetary pinions interposed between said gears and in constant mesh therewith, a differential spider circumscribing said pinions and providing a bearing therefor, and means whereby relative vertical movement of one truck unit in relation to the other unit will act through the differential spider to produce a modified movement of the main frame, and cushioning means adapted to absorb excessive strains delivered to said spider.

7. In combination with the tractor main frame and opposite parallel load supporting truck units, of means for pivotally connecting the truck units with the main frame along a single transverse axis, a torsion arm rotatable in relation to said axis and engageable by the main frame and means whereby the separate truck units may move independently of each other and will transmit a fraction of their movement to the torsion arm and the main frame to produce an equalization of the variation in relation between the truck units.

8. A chain track tractor comprising a main frame, a truck mechanism at each side thereof, a suspension means for the main frame formed by a transversely extending member connecting opposite truck mechanisms together, and about which the latter oscillate in a vertical plane, and means embodied in said frame suspension for equalizing the load upon opposite truck mechanisms and stabilizing the main frame.

In testimony whereof I have hereunto set my hand in the presence of two subscribing witnesses.

ELMER E. WICKERSHAM.

Witnesses:
JOHN H. HERRING,
W. W. HEALEY.